Aug. 27, 1957  W. WHALEY  2,804,220
MINE TRANSFER CARS
Filed June 5, 1953  10 Sheets-Sheet 3
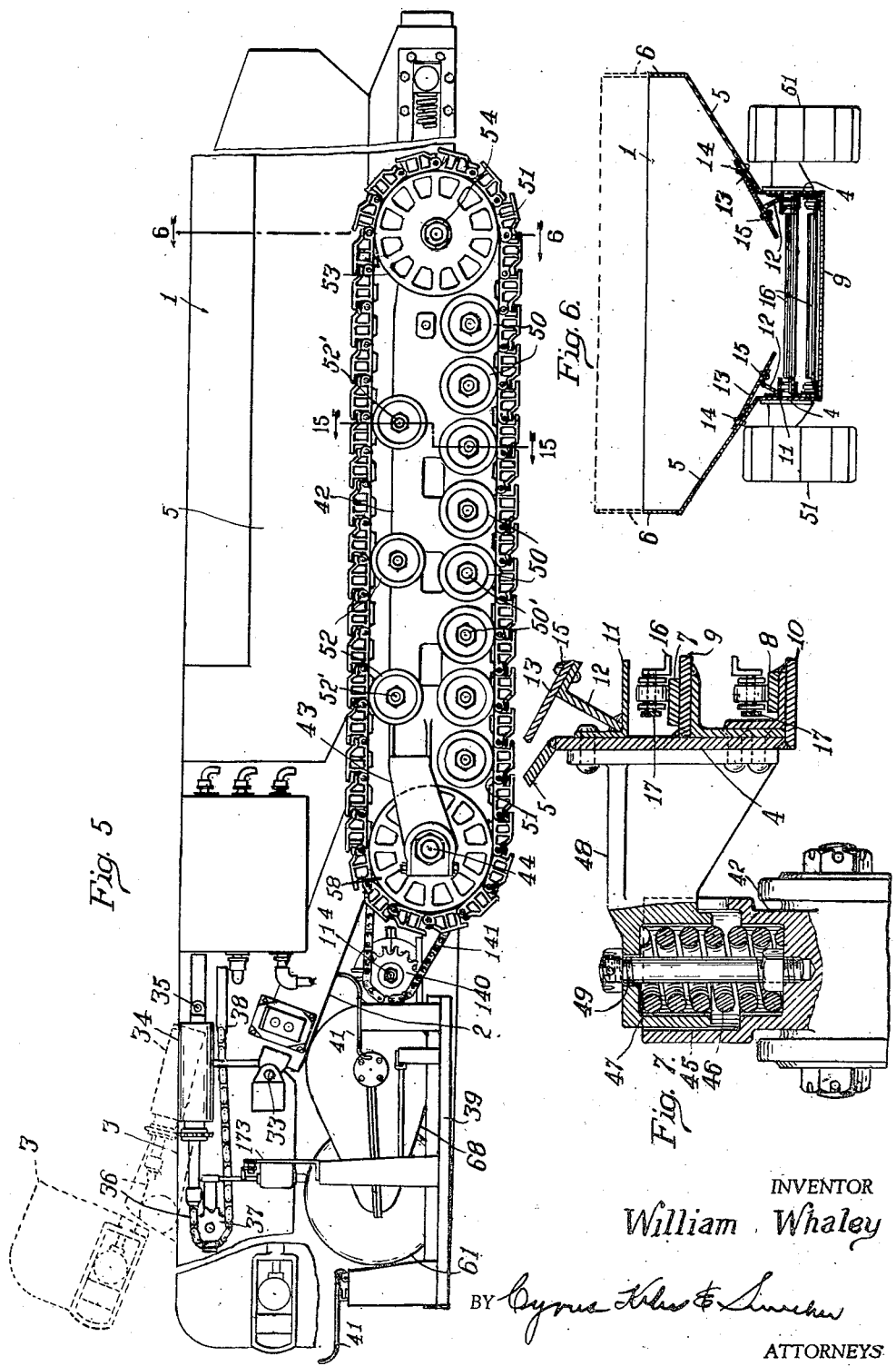
INVENTOR
William Whaley
BY
ATTORNEYS

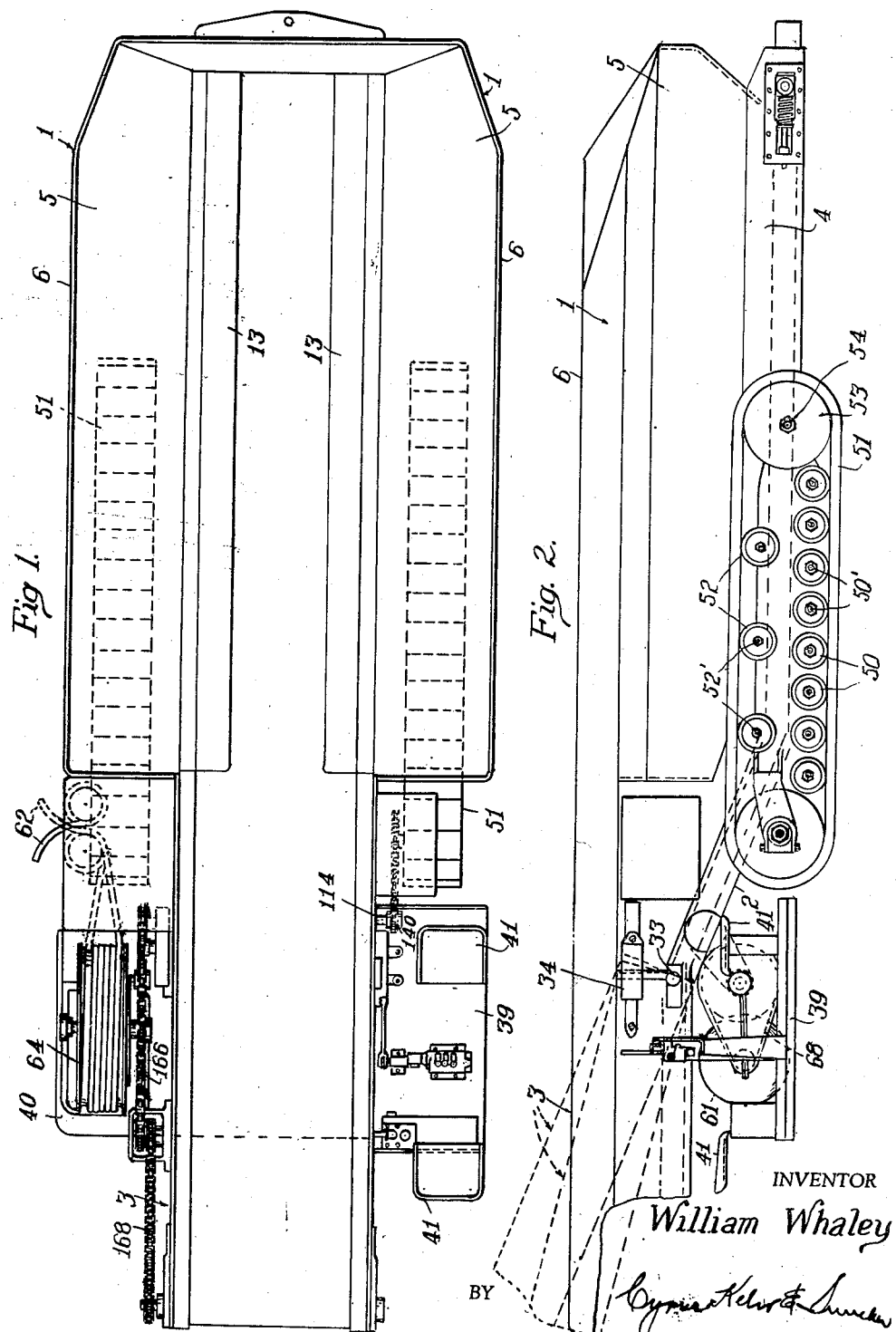

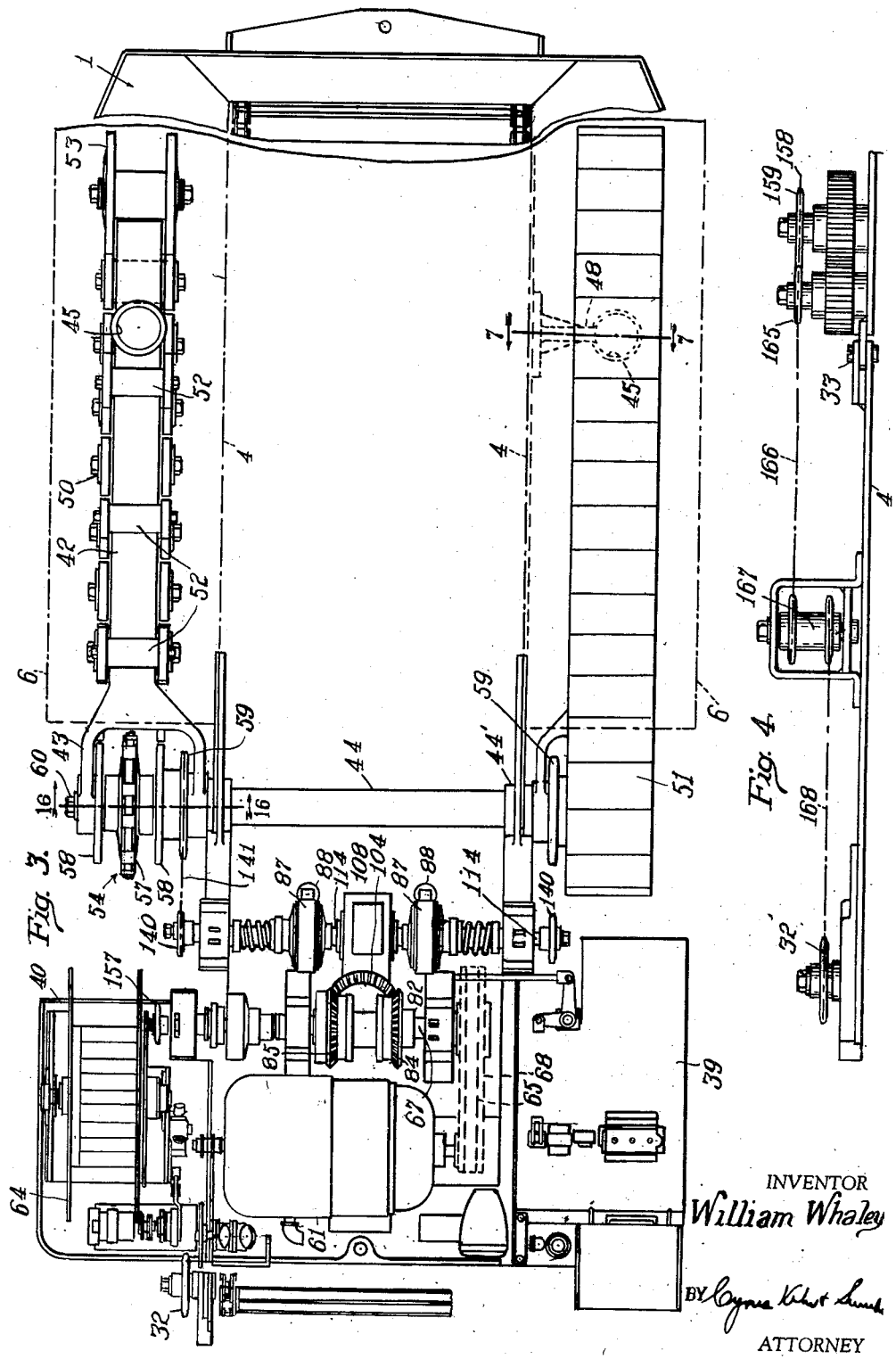

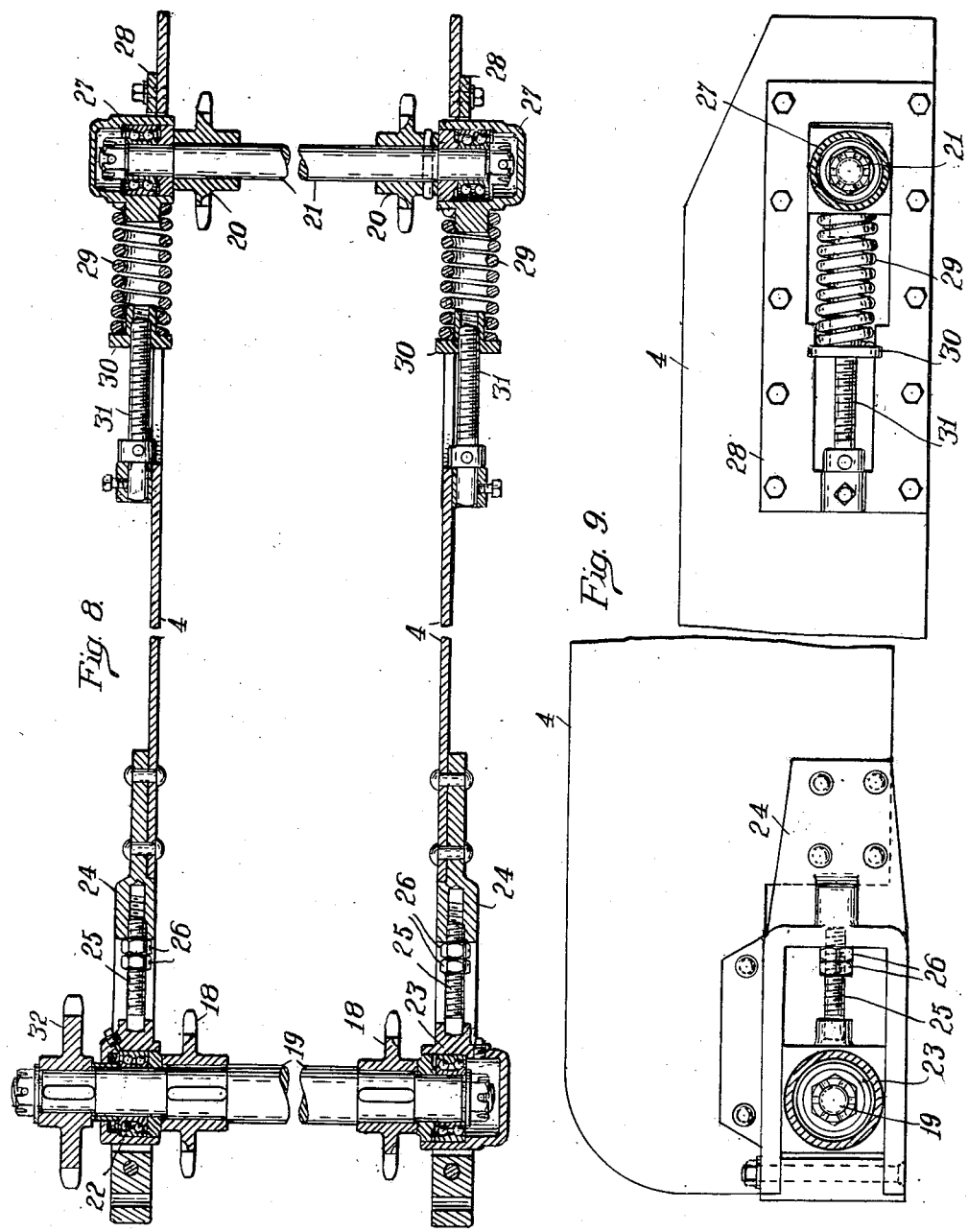

Aug. 27, 1957   W. WHALEY   2,804,220
MINE TRANSFER CARS
Filed June 5, 1953   10 Sheets-Sheet 5
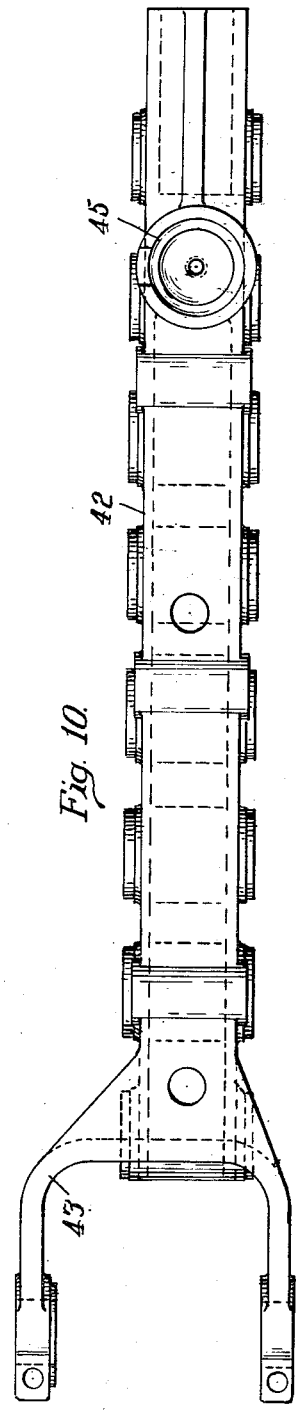
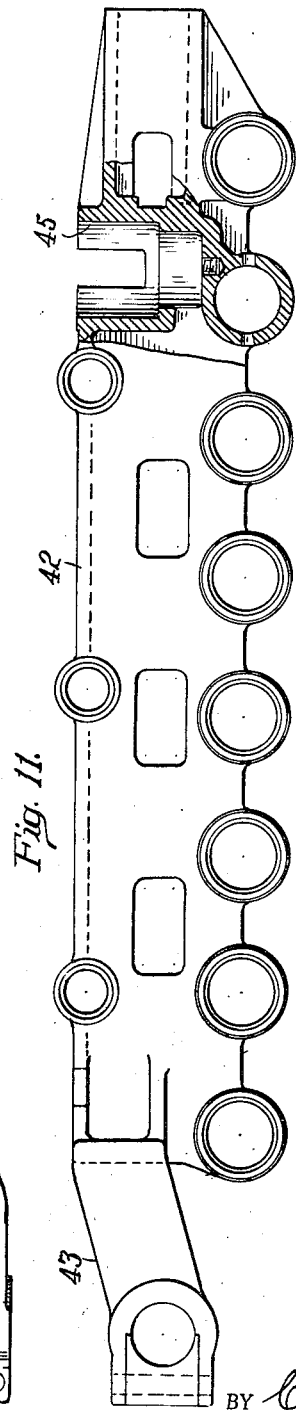
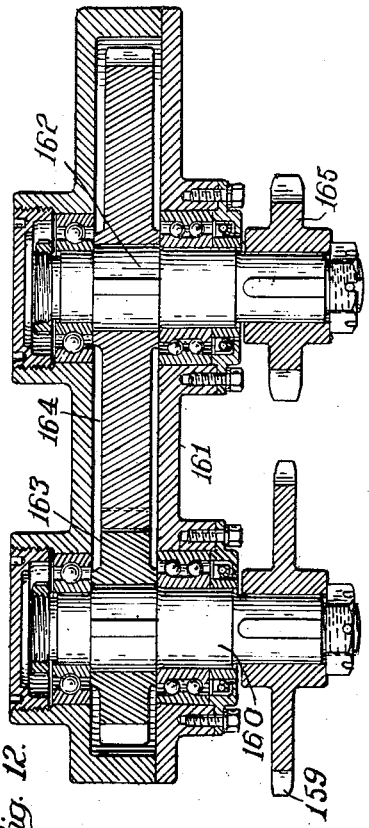
INVENTOR
William Whaley
BY
ATTORNEYS Aug. 27, 1957 W. WHALEY 2,804,220
MINE TRANSFER CARS
Filed June 5, 1953 10 Sheets-Sheet 6
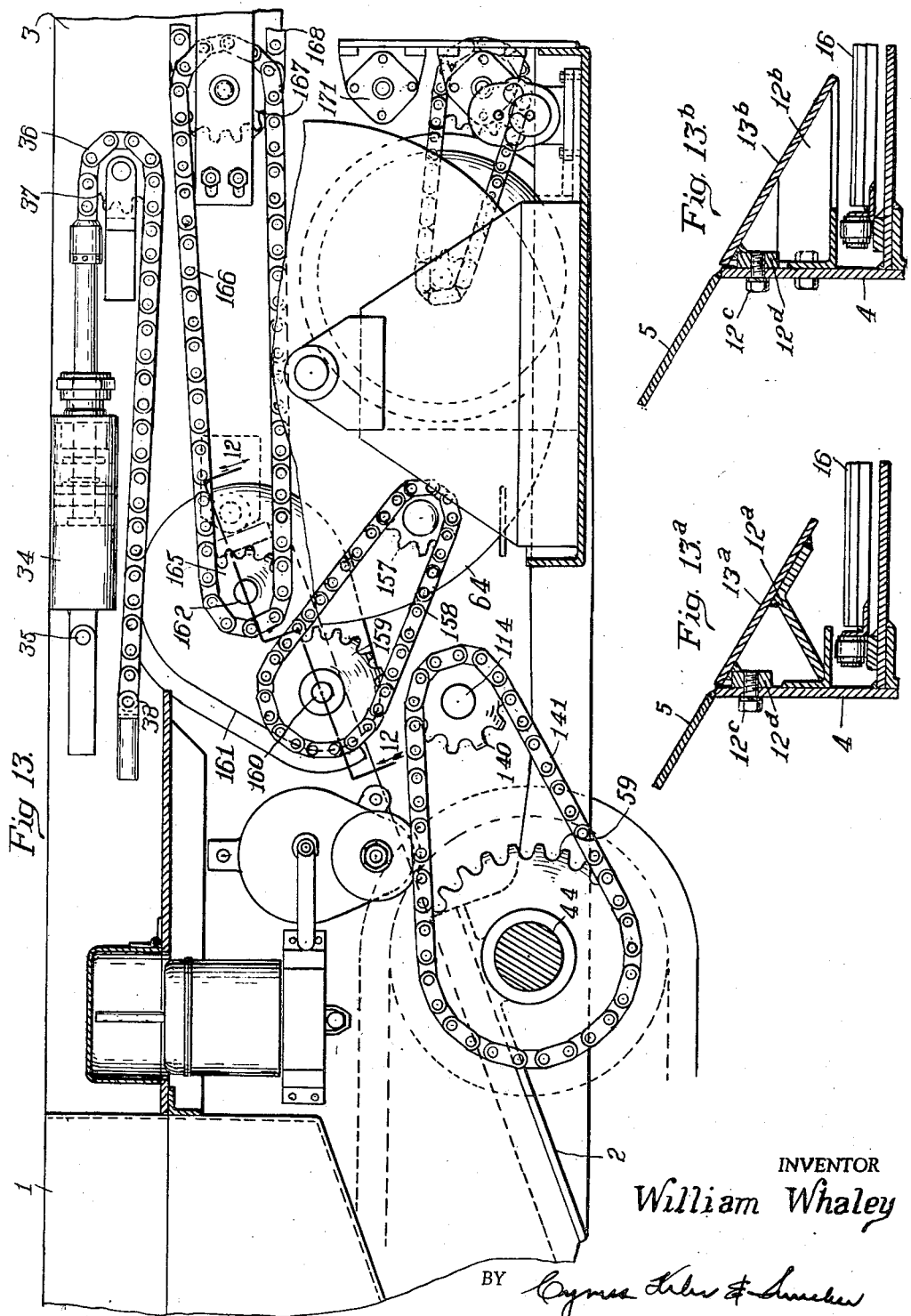
INVENTOR
William Whaley
ATTORNEYS

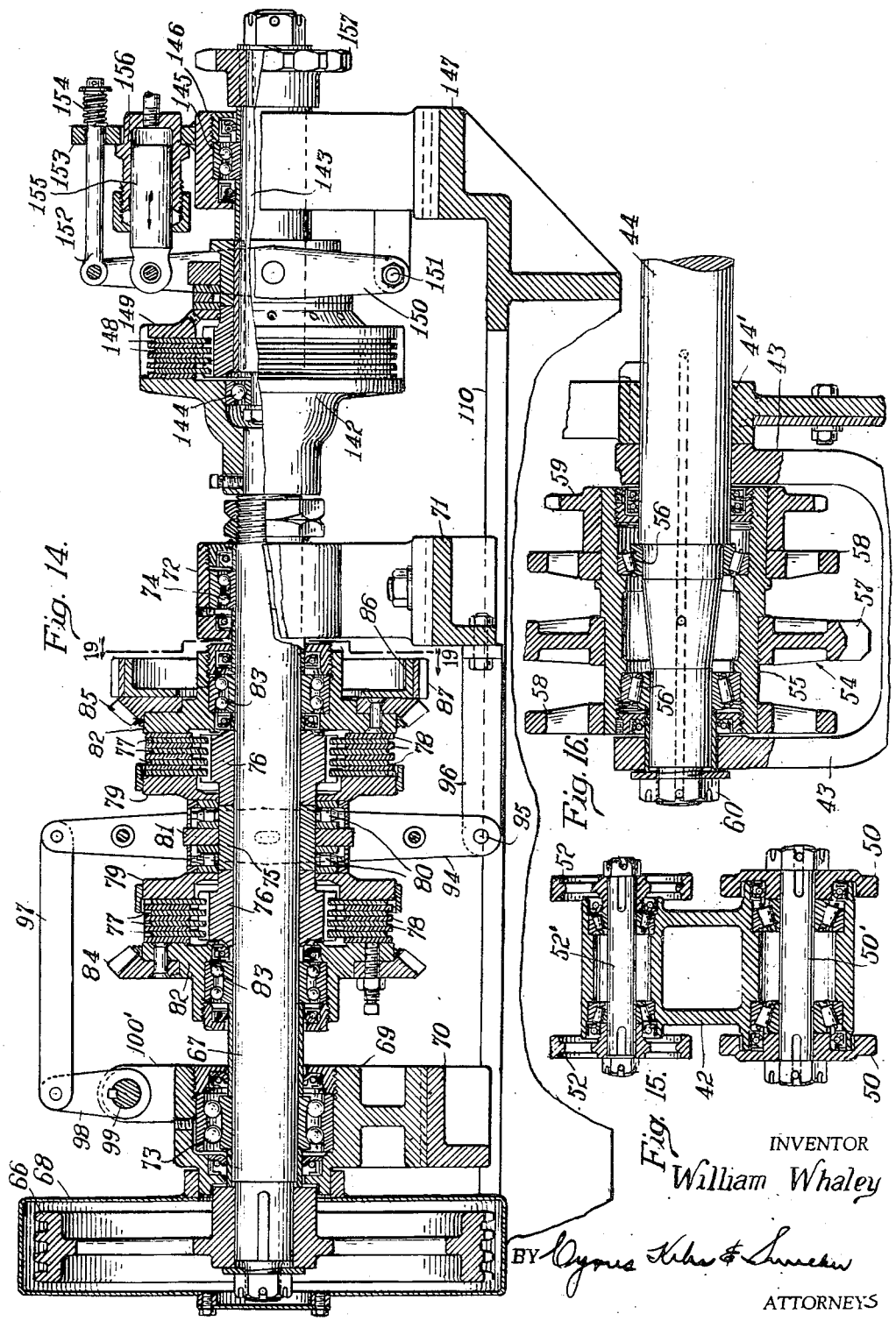

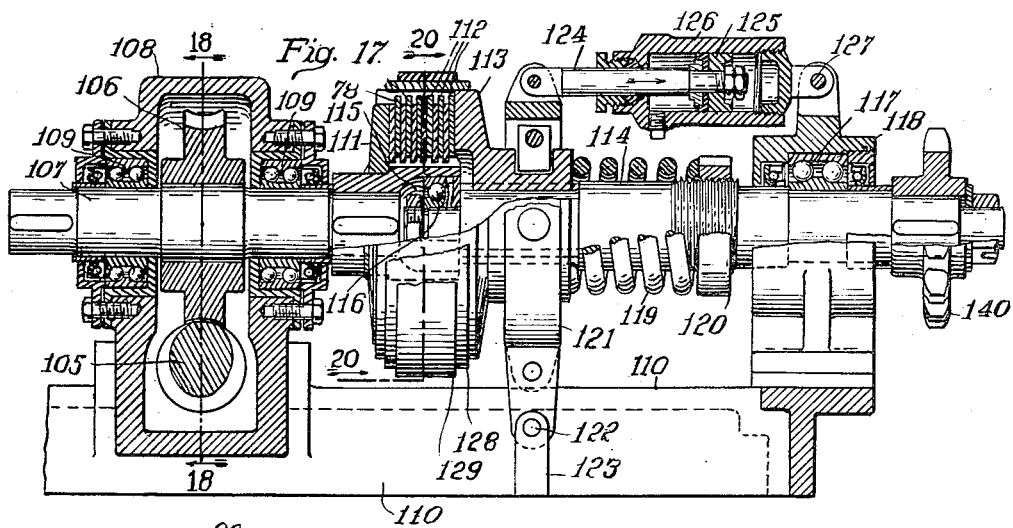
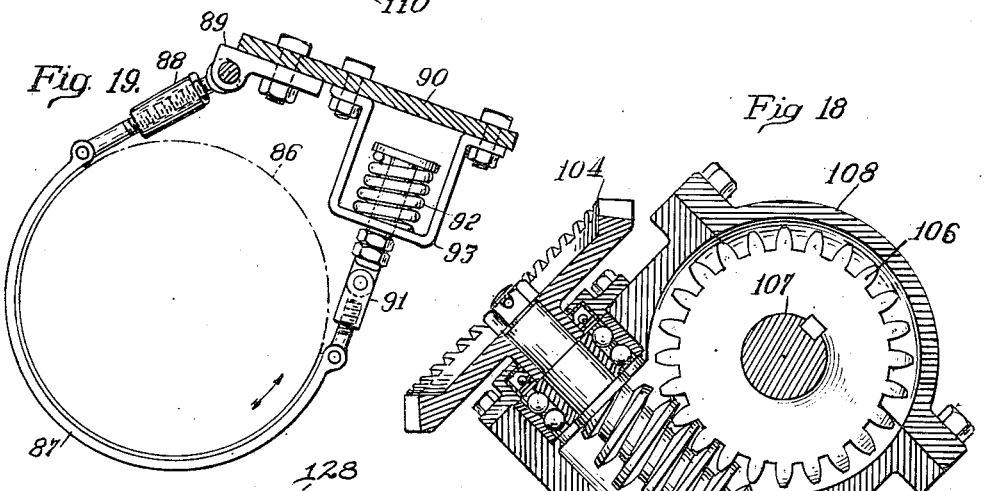
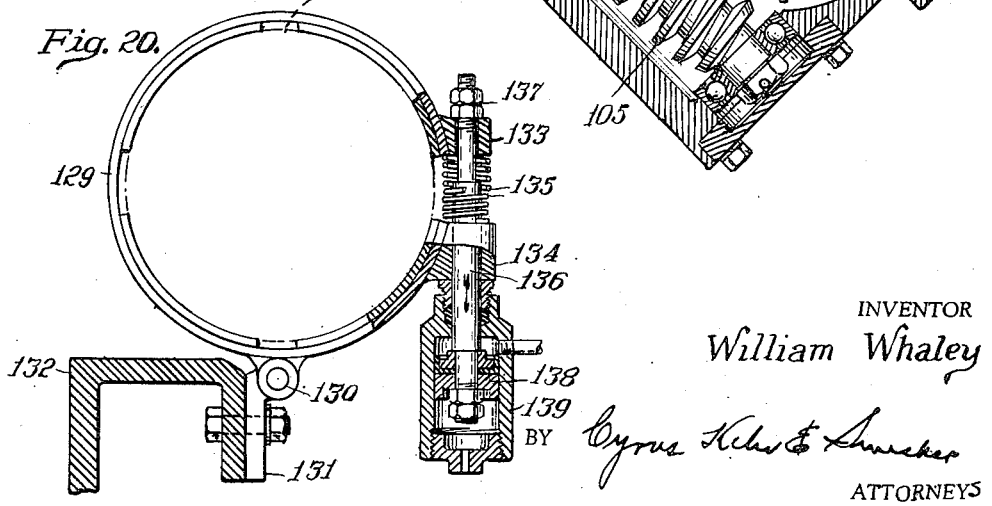

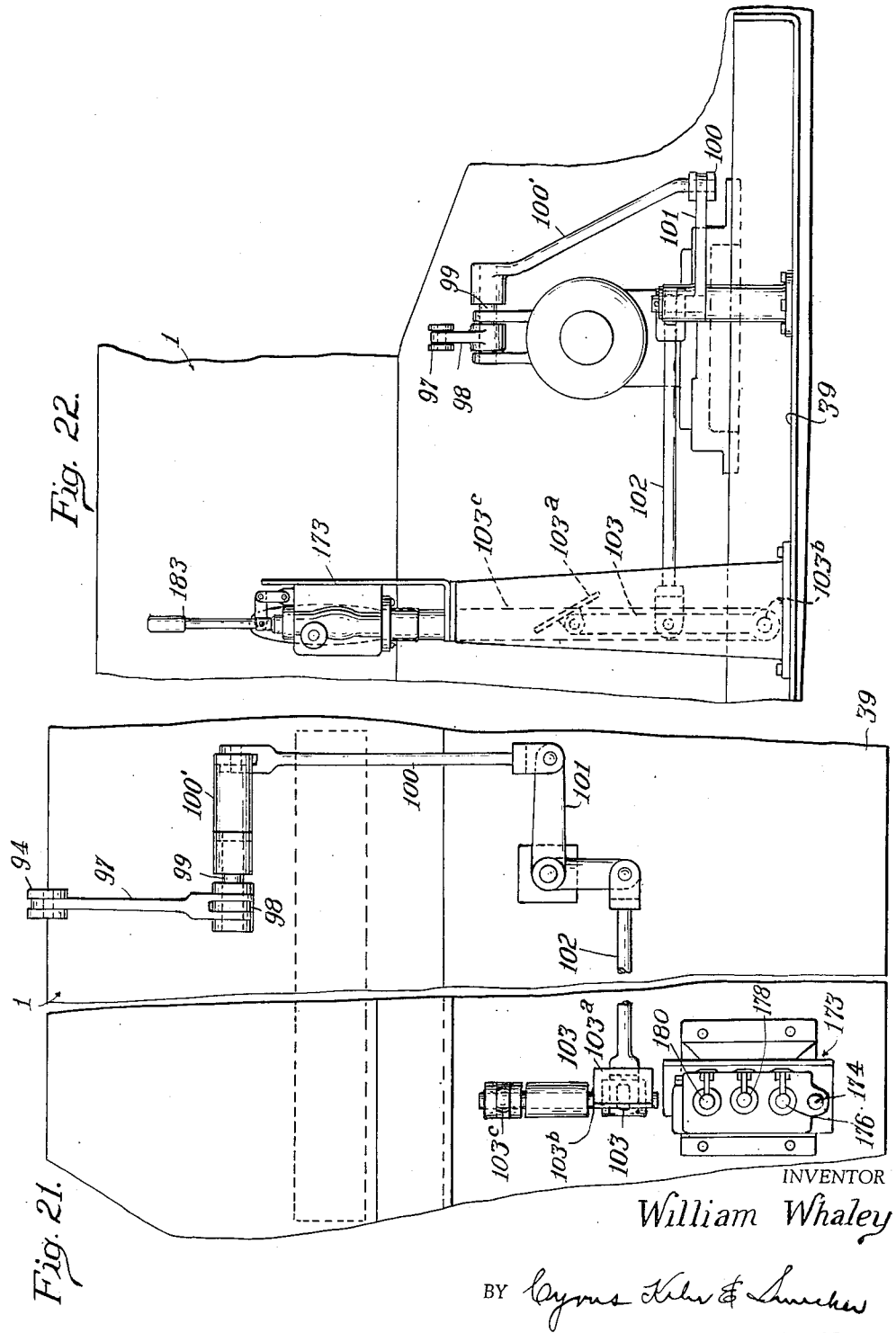

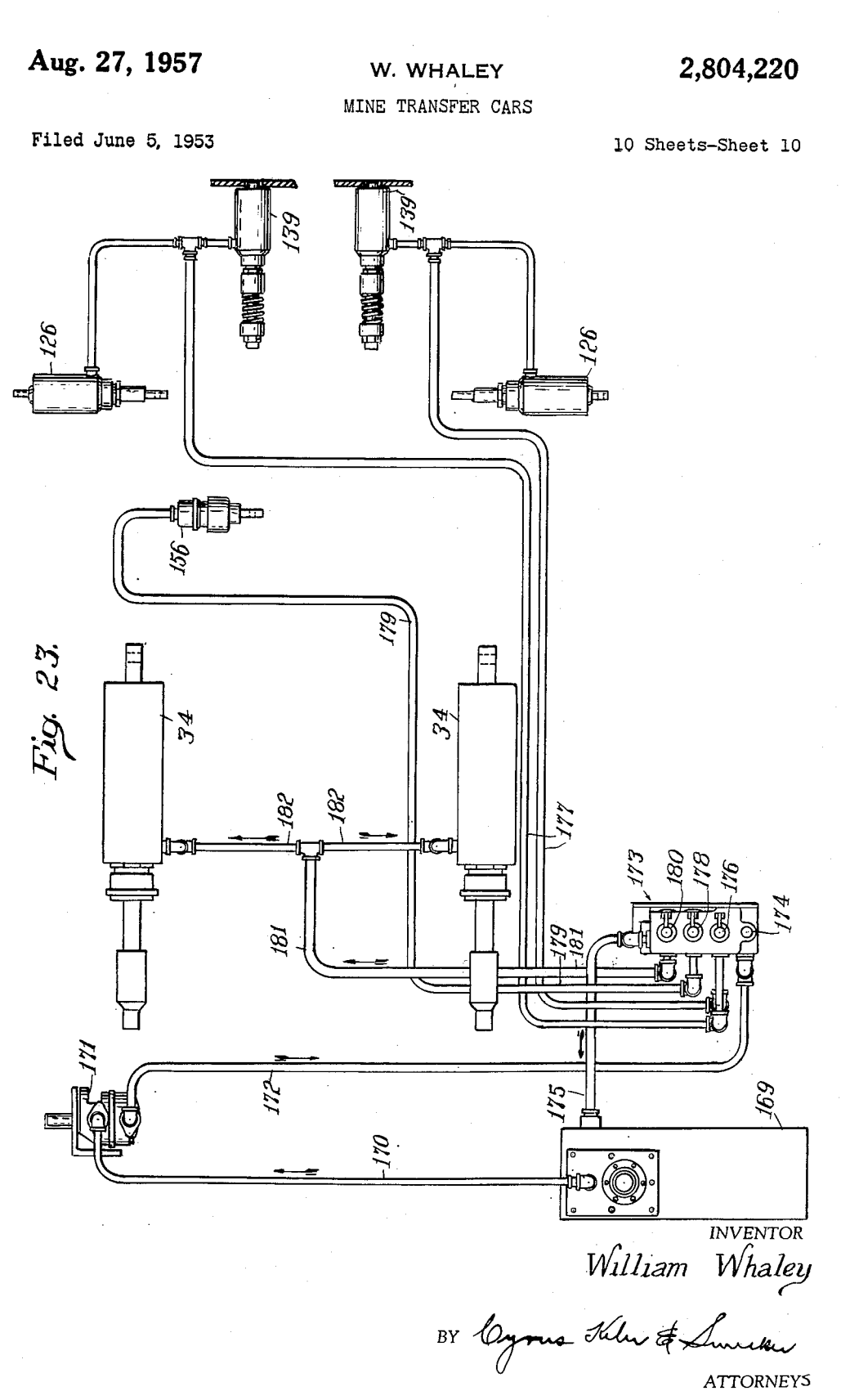

Aug. 27, 1957 W. WHALEY 2,804,220
MINE TRANSFER CARS
Filed June 5, 1953 10 Sheets-Sheet 10

INVENTOR
William Whaley
BY
ATTORNEYS

United States Patent Office 2,804,220
Patented Aug. 27, 1957

2,804,220

MINE TRANSFER CARS

William Whaley, Knoxville, Tenn.

Application June 5, 1953, Serial No. 359,692

4 Claims. (Cl. 214—83.36)

This invention relates to improvements in transfer cars for use in connection with loading machines to receive coal or other loose material and to transfer the same to a remote discharge point.

In my prior patents, Nos. 2,274,313 and 2,274,314, granted February 24, 1942, I have set forth transfer cars adapted for travel on rails in a mine by means of wheels supporting the cars and guided by a trackway. Those cars require the laying of a track in the mine from the point of loading of the coal or other loose material and extending out to the point of discharge where such material may be directed into bins, tipples, mine cars, or the like.

Transfer cars or haulage vehicles have also been proposed which have not required the use of tracks laid in the mines, but in which the cars are supported on wheels, usually four wheels, that may be steered or guided in travelling from the point of loading to the point of discharge. Such vehicles have difficulty in travelling over the character of working surfaces provided in the mines, that are often irregular or rough, and in some instances soft, due to the presence of lumps of coal, rocks, water, loose dirt, etc. which makes traction difficult.

One object of this invention is to improve the construction of transfer cars of the types proposed, or in use heretofore.

Another object of the invention is to provide for more secure traction for such transfer cars by mounting the same on an endless tread or crawler structure, dispensing with the use of wheels either mounted directly on the ground surface or on rails, and thereby insuring of effective traction in the different conditions encountered in mines, while providing for effective haulage of substantial loads in service.

Still another object of the invention is to improve the construction of crawler equipment to provide for control thereof hydraulically, to adapt such equipment to the support of transfer cars for transporting coal or any other loose material in a mine from a point of loading to a point of discharge, under the effective control of an operator, not only by moving the vehicle forward or backward, as desired, but also to operate the conveyer and separate sections of the transfer car to accomplish the loading and discharge of the lading.

A still further object of the invention is to improve the body structure of the transfer car to provide a wide hopper-shaped body, with an inclined section and an adjustable conveyer section at the rear end, and with a conveyer mounted therein which may be used either to facilitate loading of the cargo or for discharge thereof when the transfer car has been moved to the point of discharge of the lading therefrom.

These objects may be accomplished according to one embodiment of the invention wherein the body structure is provided with a relatively wide hopper-shaped body at the forward end of the car which terminates at the rear end portion thereof in an inclined section. A conveyer is mounted in the bottom of the body and extends over the inclined section and along an adjustable section that may be raised or lowered, the conveyer being continuous and used to discharge the lading from the body when the car reaches the point of discharge. It may be used also to facilitate loading of the car by being operated to shift the lading back toward said inclined section.

The body structure is mounted upon crawlers, one on each side of the body. The crawlers are operated by power mechanism from a drive motor, and are controlled hydraulically by clutch and brake means whereby the operator may maintain complete control over the movements of the vehicle. Provision is made for steering, through a control of the clutch means so as to drive either of the crawlers, as desired, or both together. The drive mechanism is located under the inclined section at the rear end of the body. A platform on one side thereof provides support for the operator.

This embodiment of the invention is shown in the accompanying drawings in which:

Fig. 1 is a top plan view of a transfer car embodying this invention;

Fig. 2 is a side elevation thereof;

Fig. 3 is a partial top plan view of the transfer car, with parts broken away to show the drive mechanism, and on an enlarged scale;

Fig. 4 is a detailed plan view of the conveyer drive;

Fig. 5 is a side elevation of the car, on an enlarged scale, with parts broken away;

Fig. 6 is a cross-section through the body structure on the line 6—6 in Fig. 5;

Fig. 7 is a detailed cross-section through the body support on the line 7—7 in Fig. 3;

Fig. 8 is a detailed horizontal section through the conveyer shaft assemblies;

Fig. 9 is a side elevation thereof;

Fig. 10 is a top plan view of one of the crawler frames, detached;

Fig. 11 is a side elevation thereof;

Fig. 12 is a cross-section through the conveyer drive assembly on the line 12—12 in Fig. 13;

Fig. 13 is an assembly view in side elevation, with parts in section, showing the rear portion of the transfer car and particularly the drive mechanism;

Fig. 13a is a detailed cross-section showing a modified mounting of the flow plates;

Fig. 13b is a similar view showing a further modification thereof;

Fig. 14 is a longitudinal section through the assembly transmission shaft;

Fig. 15 is a cross-section through the track roller assembly on the line 15—15 in Fig. 5;

Fig. 16 is a cross-section through the assembly head sprocket on the line 16—16 in Fig. 5;

Fig. 17 is a longitudinal section through the assembly drive to one of the crawlers;

Fig. 18 is a cross-section therethrough on the line 18—18 in Fig. 17;

Fig. 19 is a cross-section through the transmission brake on the line 19—19 in Fig. 14;

Fig. 20 is a similar view through the steering brake assembly on the line 20—20 in Fig. 17, with the clutch structure and shafts omitted;

Fig. 21 is a top plan view of the operator's platform and control valve assembly;

Fig. 22 is a side elevation thereof; and

Fig. 23 is a diagrammatic view of the hydraulic control system.

The transfer car shown as an embodiment of this invention is adapted to receive coal, rock, or other loose lading into a relatively wide hopper-shaped body, which is provided with an inclined section and an adjustable section at the rear end. The body is mounted on crawlers or endless track devices, operated under the control of an operator so as to move by self-propelling mechanism back and forth in a mine, toward a loading point or a discharge point.

*Body structure*

The body structure of the car and the general manner of operating the conveyer for discharging the lading therefrom are substantially the same as set forth in my prior patents, Nos. 2,274,313 and 2,274,314, with some variations as shown and described herein.

The structure comprises a forward section that is formed as a relatively wide hopper, generally designated by the numeral 1, which terminates in an inclined section 2, and an adjustable conveyer section 3, both of the latter being at the rear end of the car and relatively restricted in width, appreciably narrower than the hopper section 1.

The hopper section 1 is shown in cross-section in Fig. 6, and comprises a pair of longitudinal members or side wall sections 4, sufficiently heavy to support the body of the car on the crawlers. These side wall sections 4 extend lengthwise of the hopper section 1, as shown in Fig. 2. Side wall flare plates 5 extend outwardly from the upper edges of the sections 4 and terminate in outer upright walls 6, which walls 5 and 6 form the sides of the hopper 1.

The side wall sections 4 have tracks 7 and 8 extending lengthwise of the inner surfaces thereof and supported upon suitable structural members above a bottom closure plate 9, as shown in Figs. 6 and 7. An angle member 11 also extends lengthwise above the uppermost track 7 on each side of the car, and supports an inverted angle member 12 by welding or other secure fastening. A flow control sheet 13 is seated at one edge upon the side wall flare plate 5, to which it may be secured by fastenings 14, and at the opposite edge the flow sheet 13 rests upon the inverted angle member 12 to which it is secured by fastenings 15. As shown in Fig. 1, the flow control plates 13 extend substantially throughout the length of the hopper 1.

The flow control sheets 13 may be mounted in other ways, as is illustrated in Figs. 6 and 7, and need not be seated directly upon the side wall flare plates 5 of the car body. In the modifications shown in Figs. 13a and 13b, the flow control sheets 13a and 13b, respectively, do not overlap the body plates of the side walls but extend in alignment therewith and are secured thereto and to the side wall sill sections 4, as shown. In Fig. 13a, the flow control sheet 13a is seated and secured upon an angle section 12a, which supports the inner edge of the sheet. In Fig. 13b the flow control sheet 13b is secured upon a gusset plate 12b, secured upon an angle 12c at the inner face of the side wall sill section 4. Each of these supporting members may be welded or otherwise secured to the inner edge portion of the flow control sheet. The outer edge portion of the flow control sheet may be secured by welding or otherwise to a bar 12d connected with the side wall sill section 4 by cap screws 12e, as shown in Figs. 13a and 13b.

The conveyer is designated generally at 16 and comprises the usual endless belt upon which flights are secured at intervals, and rollers travelling on the tracks 7 and 8. This conveyer extends throughout the length of the car in the bottom of hopper 1, as well as continuously over the inclined section 2, and the rear end section 3, being suitably guided for travel therealong. The endless chains at the opposite sides of the conveyer, forming parts thereof, are designated at 17. These chains drive the conveyer and are power driven, as hereinafter described.

The chains 17 extend over drive sprockets 18 on a head shaft 19, shown in Figs. 8 and 9, at the free end of the rear end section 3. The chains 17 also extend over sprockets 20 on a foot shaft 21 at the forward end of the hopper 1. The sprockets 18 should be keyed or otherwise fixed to the shaft 19, which is the drive shaft for the conveyer, while the sprockets 20 may be free or pinned to the shaft 21, as shown and desired.

The head shaft 19 is journaled in bearings mounted in housings 22 and 23. Each of these housings 22 and 23 is slidably mounted in a guideway in a take-up plate 24, secured to each opposite side of the rear end section 3. Adjustment is accomplished by a screw 25 and nuts 26 threaded thereon, interposed between the respective bearing housings 22—23 and the ends of the slots in the take-up plates 24.

At the forward end of the hopper 1, the foot shaft 21 is journaled in bearings mounted in housings 27, slidably mounted in guideways formed in respective opposite front take-up plates 28 secured to the opposite side sill members 4. A coiled spring 29 is interposed between each of the bearing housings 27 and an adjustment nut 30 on a take-up screw 31, carried by the take-up plate 28. Thus spring tension is applied to opposite ends of the foot shaft 21, normally tending to stretch the conveyer in a direction lengthwise thereof to maintain proper tension thereon under adjustment of the screws 31, as well as by adjustment of the nuts 26 on the screws 25 acting on the head shaft 19.

The head shaft 19 projects through the bearing housing 22 to a point externally of the left-hand side of the transfer car, as shown in Figs. 8 and 13. This projecting end of the shaft 19 is provided with a sprocket 32 fixed thereon, power driven from the drive mechanism hereinafter described to operate the conveyer.

Referring to Fig. 5, the rear end section 3 is supported on the inclined section 2, at the rear of the latter, on pivots 33 which connect these sections together for relative swinging motion of the section 3 about the horizontal axes of the pivots 33, as indicated by full lines and by dotted lines in Fig. 5. This swinging motion is accomplished by a power driven assembly interconnecting the sections 2 and 3, as shown. This assembly comprises a horizontal hydraulic power device on each side thereof, generally indicated by the numeral 34, and is of the usual character comprising a cylinder with a piston mounted therein, the device being, as usual, a single acting unit in which fluid is admitted into the rear end of the cylinder for applying motion to the piston under power toward the front of the car (see Fig. 23).

Each hydraulic power device 34 is pivotally mounted at 35 on each side of the hopper adjacent the rear end of the inclined section 2 thereof. The piston of the power device is connected with one end of a chain 36 that extends around a sprocket 37 journaled on each side of the rear end unit 3, thence back upon itself to a stationary point of connection of the chain at 38, on a side of the hopper section 1 adjacent the inclined portion 2 thereof.

With the rear end section 3 in the full line position shown in Fig. 5 and the pistons in their rearmost positions, it will be apparent that the application of fluid pressure into the rear ends of the cylinders of the power devices 34 will move the pistons forward therein, shortening the chains 36, thus drawing forward on the guide sprockets 37 and swinging the rear end section 3 about the pivots 33, moving said section upward as indicated in dotted lines in Fig. 5. Upon release of the fluid pressure from the cylinders of the power devices 34, the rear end section 3 is permitted to drop by gravity into its full line position again, substantially horizontally, as shown.

Also mounted on the side sill sections 4 of the hopper section 1, are platforms 39, 40, on the respective opposite sides of the car. The platform 39 is adapted for supporting the operator, having seats 41 thereon, if desired, and suitable controls for the power mechanism of the car as hereinafter described. On the platform 40 an electric cable reel may be mounted, as described hereinafter.

Crawler structure

The car is supported on crawlers, one on each side thereof, as shown in Fig. 6, connected with the side sill sections 4. These crawlers are identical in construction and manner of operation.

Each of the crawlers comprises an elongated frame, designated generally at 42 in Figs. 10 and 11. The frame 42 is provided with a yoke 43 at the rear end thereof, sleeved over one end of a head shaft 44 (Fig. 3). The shaft 44 extends transversely from side to side of the hopper section 1 and is secured at its opposite ends in mounting brackets 44' fixed to the side sill sections 4, as shown in Figs. 3 and 16. The shaft 44 is non-rotary in practice.

Adjacent the opposite end of the frame 42 from the yoke 43, the former is provided with a socket 45, shown also in Fig. 7. A coiled spring 46 is seated at one end at the bottom of the socket 45, while the opposite end of the spring 46 is enclosed within a cup 47, formed on the free end of a bracket 48. The bracket 48 extends laterally from, and is secured rigidly to, the side wall section 4, adjacent the front end of the crawler, as shown in Fig. 3. A tie-bolt 49 extends through the spring 46, being connected at one end with the frame 42 and having the opposite end bearing upon the cup 47, as shown in Fig. 7.

Journaled at intervals along the lower side of the frame 42 are guide rollers 50, keyed on shafts 50', and in position to bear upon the upper face of the lower run of the endless tread structure, generally designated 51. Guide rollers are also shown at 52, keyed on shafts 52', at intervals along the upper edge of the frame 42, in position to bear against the inner face of the upper run of said endless tread structure 51. The shafts 50' and 52' are journaled on bearings in the frame 42, as shown in Fig. 15.

The endless tread structure 51 is of the usual character, comprising chain links pivoted together, with appreciable transverse width, in the form of bars, which ride upon the rollers 50 and 52.

At the forward end of the frame 42, the endless tread structure passes over a guide roller 53 journaled at 54 on the forward end of the frame 42, as illustrated in Figs. 3 and 5.

At the rear end of the endless tread structure 51 is provided a driving head sprocket assembly, generally indicated at 54, and shown more in detail in Figs. 3, 5, and 16. The sprocket assembly 54 comprises a hub 55 journaled on bearings 56 on each opposite projecting end of the shaft 44. A sprocket 57 is fixed on the hub 55 by welding or otherwise and interfits at its periphery with the inner face of the endless tread assembly 51, forming a driving connection therewith to move the latter rectilinearly upon rotation of the sprocket 57.

Also fixed to the hub 55, on opposite sides of the sprocket 57 are rims 58, forming bearing rollers for the inner surface of the endless tread assembly 51 at opposite sides of the latter.

A drive sprocket is shown at 59 fixed to the hub 55 at the inner end thereof to receive a drive chain for driving the head sprocket assembly 54. This sprocket 59 is power driven, as hereinafter described. The assembly 54 is retained in place on the shaft 44, by a nut 60 on the outer end of the shaft.

Driving assembly

In the embodiment of the invention as illustrated, the transfer car is operated by a single electric motor 61 mounted on a platform beneath the inclined section 2 of the body structure, and in part beneath the rear end section 3. This single motor not only operates both of the crawlers, but it also moves the conveyer to fill or discharge the lading.

This electric motor 61 is supplied with current from an available source of electrical supply, through an electric cable generally indicated at 62 in Fig. 1, and preferably wound on a cable reel 64, mounted on the platform 40. Suitable means may be used for operating the cable reel 64 in timed relation with the movement of the transfer car forward and backward in the mine, relative to the stationary end point of the cable 62.

I have devised a special form of hydraulically operated cable reel, which is included in my companion application therefor, which may be used for this purpose. A reference is made to the said companion application for a full disclosure thereof without its being incorporated herein. Any suitable reel operating mechanism may be used, however, if desired, as well known in the art heretofore. The armature shaft of the motor 61 is provided with a drive sprocket thereon, receiving a sprocket chain 65 (Fig. 3) that passes thereover and over a sprocket wheel 66 fixed on a drive shaft 67, on which the power drive mechanism is provided as shown in Fig. 14. The sprocket chain 65 and sprocket wheel 66 are preferably enclosed within a housing 68 which is fixed to a bearing housing 69 carried by a base 70.

A companion base 71 is spaced from the base 70, and these are supported on a fixed part of the car structure between the side sill members 4. The base 71 carries a bearing housing 72. The shaft 67 is journaled in bearings 73 and 74, mounted in the housings 69 and 72, and said shaft is supported thereby.

Mounted on the shaft 67 is a hub 75. On opposite sides of the hub 75 are a pair of driving hubs 76, keyed or otherwise fixed to the shaft to be driven thereby. The hubs 76 carry friction discs 77 of a clutch assembly, with interposed pressure discs 78 therebetween. A pressure plate 79 bears on one side against each set of the clutch discs 77—78, bearing laterally against thrust bearings 80 on a shift ring 81, which shift ring surrounds the hub 75 and is slidable axially thereof.

At the opposite side of each clutch formed by the clutch discs 77—78 is mounted a cup 82 journaled on bearings 83, surrounding the drive shaft 67. Beveled gears 84, 85 are fixed to the clutch cups 82, the beveled gears 84—85 for the respective clutches being turned in facing relation, as viewed in Fig. 14.

Secured to the beveled gear 85 is a brake drum 86 (see Fig. 19). The brake drum 86 is surrounded by a brake shoe 87, one end of which is anchored by a take-up link 88, to a bearing block 89 on a plate 90 secured to a stationary portion of the car body. The opposite end of the brake shoe 87 is connected by a link 91 with the remote end of a coiled spring 92 enclosed within a bracket 93, secured to the plate 90 (Fig. 19). The purpose of this spring is to give a limited pressure on the brake band. The spring could be omitted. This is a "parking" brake.

The shift ring 81 may be moved back and forth in either direction by a shift lever 94 either to engage the forward or reverse clutch 77—78 (Fig. 14). One end of the shift lever 94 is pivotally supported at 95 on a bracket 96, secured to the base 71. The opposite end of the shift lever 94 is pivotally connected by a link 97 with a rocker lever 98. The rocker lever 98 is mounted on a rock shaft 99 carrying an arm 100', connected with one end of a link 100 (Figs. 21 and 22), which extends to a bell-crank 101. The bell-crank 101 has an arm connected by link 102 with a vertical lever 103 with a pedal 103a, on a shaft 103b on the other end of which is a vertical lever 103c. Upon actuation of one of the pedals 103, or lever 103c, the shift lever 94 will be moved in one direction to engage one clutch and in the opposite direction to engage the other clutch 77—78.

The clutches 77—78 are drive clutches from the drive shaft 67 to the respective beveled gears 84 and 85, alternately driving either of the gears 84 or 85, or the latter can remain stationary. The shift lever 97 with the shift ring 81 move the clutch plates 79 from neutral positions in which the clutch discs 77 are free without turning of either beveled gear 84 or 85, to engage either of the clutches 77—78, according to the driving of the gears 85 or 84 either forward or backward. The beveled gear 104 (Figs. 3 and 18), between and meshing with the gears 84 and 85, is turned in the direction of the engagement of the respective clutches connected with the driving beveled gears, and the gear 104 in turn drives the worm 105 and the worm gear 106 to drive the shaft 107. Thus, the shaft 107 drives the crawlers to move either forward or in the reverse direction by means of the reversing clutches 77—78. The shift lever 94 is moved selectively to engage either of the clutches on the beveled gear 84 or 85, by the selective engagement of either of the foot pedals 103 (Fig. 22).

Referring to Fig. 18, a beveled gear 104 is interposed between the beveled gears 84—85, in constant mesh with both gears. The operation of the beveled gear 104 by either gear 84 or 85, will rotate a worm 105 on the shaft 20 to which the beveled gear 104 is fixed. The worm 105 is in mesh with a worm gear 106 mounted on a shaft 107. The worm and worm gear 105 and 106 are enclosed within a housing 108 supporting bearings 109, in which the shaft 107 is journaled. The housing 108 is supported on a cross piece 110, carried by the frame structure of the car.

The shaft 107 is in fact a stub shaft and projects in opposite directions from the housing 108, as shown in Fig. 17. Each of the opposite ends of this shaft 107 is connected with a drive to one of the crawlers, one end being connected to one crawler, and the other end being connected to the other crawler, for operating the latter. Only one of such drives is illustrated in Fig. 17, but it will be evident that the other drive to the crawler would be the same as that shown and is omitted merely for simplicity of illustration.

The shaft 107 has keyed to each end thereof a clutch hub 111, connected through clutch discs 112 with a clutch cup 113. The clutch cup 113 is slidably mounted on, and keyed to, a propelling shaft 114 which extends outwardly in axial alignment with the shaft 107.

The clutch hub 111 is provided with a recess 115 in which is mounted a bearing 116. The inner end of the propelling shaft 114 is journaled in the bearing 116, while the outer end of said shaft is journaled in a bearing 117, enclosed within a housing 118, supported by the frame structure of the car.

The clutch cup 113 is slidably movable toward and from the pressure plate on the clutch hub 111, being urged toward the latter by a compression spring 119 bearing at one end against the clutch cup 113 and at the opposite end against an adjusting nut 120, screw threaded onto the propelling shaft 114. By adjusting the nut 120, the spring 119 may be adjusted to take up any play in the clutch 112, and to adjust the pressure on the clutch 112.

The clutch cup 113 may be shifted to disengage the clutch 112 by the action of a shift lever 121 connected with said clutch cup. The shift lever 121 is pivotally mounted at one end at 122 to a fulcrum block 123 on the cross piece 110. The opposite end of the shift lever 121 is pivotally connected with a piston rod 124 of a hydraulic power device comprising a single acting unit having a piston 125 mounted in a cylinder 126, and connected with the piston rod 124, as shown in Fig. 17. The cylinder 126 has the head thereof at the opposite end from the piston rod 124 pivotally mounted at 127 on the housing 118, supporting the power device in position relative to the frame structure. The application of pressure into the front end of the cylinder will move the piston 125 in the direction indicated by the arrow in Fig. 17 to shift the clutch cup 113 toward the right in said figure, and thereby to disengage the clutch.

The clutch cup 113 is also provided with brake drum 128 fixed thereto about which is mounted a brake band 129, as shown in Fig. 20. The brake band 129 is fixed in position by a mounting pin 130 forming a pivotal support therefor and carried by a bracket 131 secured to a frame member 132 of the car.

The brake band 129 is split, with lugs 133 and 134 secured to opposite ends thereof. A coiled spring 135 is interposed between the lugs 133 and 134, normally tending to separate the latter and to release the brake band 129 from the brake drum 128.

The brake band may be compressed on the brake drum by a power device connected with a rod 136, which extends slidably through the lugs 133, 134, and has a head 137 on the outer end of said rod 136 in position for pressure engagement with the lug 133. Inasmuch as the brake band 129 is anchored at its lower portion, downward movement of the rod 136 in the direction indicated by the arrow in Fig. 20 will compress the brake band on the brake drum 128 and apply a braking action to the latter, tending to stop the rotation of the propelling shaft 114. This will occur simultaneously with the disengagement of the clutch 112, as hereinafter described.

The hydraulic power device connected with the rod 136 includes a single acting cylinder and piston, the latter being indicated at 138, operating in a cylinder 139, having a port for the admission of fluid in the upper end thereof above the piston. Upon the release of this fluid pressure, the spring 135 will return the piston to its initial position shown in Fig. 20, and thereby disengage the brake band 129 from the brake drum 128, which will occur simultaneously with the engagement of the clutch 112.

The propelling shaft 114 is provided with a drive sprocket 140 on the outer end thereof for driving the crawler on the corresponding side of the car. A sprocket chain 141 extends over the sprocket 140, as shown in Fig. 3, thence over the sprocket 59 of the head sprocket assembly 54, as described above. Thus, upon operation of either propelling shaft 114, the corresponding crawler will be operated in a propelling motion. The crawlers may be operated independently or simultaneously, and the car may be steered by varying the driving actions thereof.

Referring again to Fig. 14, the main clutch shaft 67 has secured to the outer end thereof a clutch cup 142. The clutch cup 142 has a recess therein receiving one end of a conveyer clutch shaft 143 that extends outwardly therefrom in axial alignment with the main clutch shaft 67. Said end of the conveyer clutch shaft 143 is journaled in a bearing 144 mounted in the recess in the clutch cup 142. The opposite end portion of the conveyer clutch shaft 143 is journaled in a bearing 145 mounted in a housing 146, supported by a portion of the frame structure of the car, as indicated at 147 in Fig. 14.

Cooperating with the clutch cup 142 are clutch discs 148, in position to be engaged by the action of a pressure plate 149, pressed against said discs by the action of a shift lever 150. One end of the shift lever 150 is pivotally mounted at 151 on a lug at a side of the bearing housing 146. The opposite end portion of the shift lever 150 is bifurcated and has an eye-bolt 152 connected therewith and extending through a lug 153 on the bearing housing 146. The outer end portion of the eye-bolt 152 has sleeved thereover a coiled spring 154, one end of which presses against an abutment on the eye-bolt 152, while the opposite end bears against the lug 153. This spring 154 normally will tend to disengage the clutch 148.

The clutch will be engaged by the action of a hydraulic power device including a piston 155 connected with the shift lever 150 and mounted in a cylinder 156, supported in abutting relation against the lug 153. This is a single-acting hydraulic power device adapted to receive fluid pressure in the outer end thereof to move the piston 155 in the direction indicated by the arrow in Fig. 14, whereby to engage the clutch 148 for driving the conveyor clutch shaft 143 from the main drive shaft 67. Upon the release of the hydraulic pressure from the cylinder 156, the spring 154 will act on the shift lever 150 to disengage the clutch 148 and thereby disconnect the shaft 67 from the conveyor clutch shaft 143.

Mounted on the conveyor clutch shaft 143 is a sprocket 157 which has a driving connection to the sprocket 32 on the head shaft 19 (Fig. 8) of the conveyor through the driving means illustrated in Figs. 4, 12, and 13.

A sprocket chain 158 extends from the sprocket 157 (Fig. 13) to the gear reducer shown in Figs. 12 and 13, and over a sprocket 159 mounted on a shaft 160 (Fig. 12). A shaft 160 is journaled in a gear case generally designated at 161 in which is also journaled a companion shaft 162. Speed reducing gears 163 and 164, intermeshing with each other, are mounted respectively on the shafts 160 and 162, for driving the latter at a reduced speed relative to the shaft 160. A sprocket 165 is mounted on the shaft 162, and being smaller than the sprocket 159 thereby effects a further reduction in speed.

A sprocket chain 166 (Fig. 4) extends from the sprocket 165 to a drive idler assembly, generally indicated at 167, mounted on the left hand side of the car. A sprocket chain 168 extends from the drive idler assembly 167 to the sprocket 32 on the head shaft 19 of the conveyer, as viewed in Fig. 8.

It will be apparent therefrom that the conveyer 16 will be driven uniformly whenever the clutch 148 is engaged to transfer motion from the shaft 67 to the conveyer clutch shaft 143. Upon disengagement of said clutch, the operation of the conveyer will be stopped.

Hydraulic control

The hydraulic control system is illustrated diagrammatically in Fig. 23. This system controls the propelling and steering of the crawlers, conveyer clutch, and rear end lift of the car.

A source of oil pressure or other hydraulic fluid should be provided and is illustrated as a reservoir or tank 169, mounted in a suitable location on the car. A pipe or conduit 170 extends from the tank 169 to a pump 171 which withdraws the oil from the tank 169 and discharges the same through a pipe or conduit 172 to a bank of valves generally indicated at 173, which are used to control these respective operations. As shown in Figs. 5, 21, and 22, the bank of valves 173 is mounted in convenient position on the operator's platform 39, within convenient reach of the operator for controlling the separate actions as required.

The bank of valves 173 comprises a valve housing or casing including a pressure relief valve generally indicated at 174 (Figs. 21 and 23) for admitting the fluid under pressure thereto from the pipe 172. This valve may be set for whatever pressure is desired for the operation of the system. The remaining valves in this bank are through-port valves, manually shifted in position, and are so constructed that when they are in neutral positions the oil passes freely therethrough and returns to the tank 169 through a pipe or conduit 175. The detailed structure of these valves is not illustrated in the drawings as they are well known in the art and any suitable form thereof may be used, as desired.

The first of the valves after the pressure relief valve 174 is a steering control valve 176. When this steering control valve 176 is shifted in one direction or the other, the fluid passes from the pressure relief valve 174 and the passage through the casing of the bank of valves 173 to one or the other of a pair of conduits 177, which extend to respective opposite sides of the car. Each of these conduits 177 is branched and connected in open communication both with the clutch control cylinder 126 (Fig. 17) and with the brake control cylinder 139 (Fig. 20) at the corresponding side of the car.

The opening of the valve 176 when moved in said direction will direct fluid through one of the conduits 177 to both the clutch release cylinder 126 and the steering brake cylinder 139 at that one side of the car, for the operation of these units as previously described. The clutch release cylinder (Fig. 17) compresses the clutch spring 119 and releases the clutch 112. The steering brake cylinder 139 (Fig. 20) applies the brake 129. These two operations are done simultaneously and as long as the valve 176 is held in this position, these units are connected. When the valve is returned to its central position, the pressure is released from these cylinders, back through the pipes 177 to the casing of the bank of valves 173, thence through the pipe 175 to the tank 169.

When the steering valve 176 is operated in the opposite direction, the oil passes through the pipe 177 at the opposite side of the car, thereby operating the brake cylinder and clutch release cylinder at said opposite side, these parts functioning in the same manner as just described. As soon as the valve 167 is returned to its central position, these pressures are released. This controls the steering either to the left or to the right, according to which of the crawler propelling shafts 114 is driven while the other is held stationary.

The next valve 178 controls the conveyer clutch 148. This is a single-acting valve, and when it is operated, the fluid pressure is in communication therethrough with a pipe or conduit 179, leading to the cylinder 156, for the application of pressure to the conveyer clutch, acting in the direction indicated by the arrow in Fig. 14, to engage the clutch. The clutch 148 thus transmits motion from the main drive shaft 67 to the conveyer clutch shaft 143, to operate the conveyer 16 in the manner described above.

This valve 178 is so adjusted that it may be operated to apply pressure to the clutch cylinder 156 and will hold this pressure when the valve is released and returns to its central position. This pressure may be released from the cylinder 156 by moving the valve 178 to its opposite or release position. The fluid pressure will then be released from the pipe or conduit 179, through the casing of the bank of valves 173, and the conduit 175, back to the tank 169.

The next valve, designated 180, controls the raising movement of the rear end section 3 of the conveyer. When this valve 180 is opened, the fluid passes under pressure through a conduit 181 and branch conduits 182 to the respective conveyer lift cylinders 34, one of which is mounted on each side of the car, as illustrated in Figs. 5 and 13. The application of pressure in the respective cylinders 34 causes the pistons therein to be forced toward the forward end of the car, thus drawing on the chains 36 and raising the rear end section 3, as indicated in dotted lines in Fig. 5. This valve 180 also retains the pressure in these cylinders when it is moved to a central position and released, thereby retaining the position of the rear end conveyer section 3. When the valve 180 is moved to its opposite position, the pressure in the cylinders 34 is released back to the tank 169, and the rear end conveyer section then drops to any position desired, as, for instance, to a horizontal position.

Each of the valves 176, 178, and 180 is adapted to be manually operated. Hand levers 183 are provided, connected with the respective valves, as shown particularly in Figs. 21 and 22, within convenient position on the platform 39, for manipulation by the operator.

Operation

The operation of the transfer car will be obvious from the foregoing description. The transfer car is designed to operate behind the loading machine and to be filled directly therefrom. The conveyer on the loading machine discharges the material into the hopper section 1 onto the conveyer 16 therein. The loading can continue until this hopper section 1 is substantially filled. If desired, the conveyer 16 can be operated to move the material backward away from the forward end of the car, During filling of the car, and while it is in the room being loaded, the rear end section 3 normally would be in the lowered position shown in full lines in Figs. 1 and 5 so as to facilitate movement of the car through low-head-room.

After being loaded, the transfer car is caused to travel backward out of the entry or room to the point of discharge. This travel is under its own power and the car can be guided to manipulate passages through which it should travel.

The manipulation of the foot pedal 113a or the lever 103c will shift the lever 94 (Fig. 14) to engage the clutches 77—78 and thereby transmit rotation in a reverse direction through the gear 85 and gearing 104—106 (Fig. 18) to the shaft 107, operating the latter in a reverse direction. As shown in Fig. 17, the engagement of the clutches 112 transmits movement from the shaft 107 to the respective propelling shafts 114. The latter drive the crawlers through the chain connections 141 and the sprocket assembly 54 (Fig. 16). The car may be steered by the control clutches 112 and brakes 129 applied to the respective propelling shafts 114 so as to drive the respective shafts at opposite sides of the car at desired speeds to attain the proper steering of the crawlers.

When the machine reaches its discharge point, and it is desired to discharge the lading therefrom into the mine cars, conveyers, bins, or the like, the rear end section 3 may be raised to a required height (one example is illustrated in dotted lines in Fig. 5) to clear the receptacles. This is accomplished by manipulating the hydraulic power devices 34 at opposite sides of this rear end section, as described above.

Then the operator engages the clutch 148 (Fig. 14) to operate the endless conveyer 16, and thus to discharge all of the lading from the car. After the transfer car is emptied it may be backed off from the mine car, or other discharge receptacle, and the conveyer section 3 lowered to its full line position in Fig. 5. Then the car may be operated back to the loading machine for refilling.

While the invention has been illustrated and described in one embodiment, it is recognized that variations and changes may be made therein without departing from the invention as set forth in the claims.

I claim:

1. In a transfer car, the combination of a supporting frame including side sill members extending lengthwise thereof, supporting and propelling mechanism connected with the side sill members, a car body mounted on the frame and including side walls connected with the side sill members, an endless conveyer extending lengthwise of the side sill members in the bottom of the car and having upper and lower runs each including supporting portions therefor, tracks mounted on the inner side of the side sill members for supporting said portions of the upper and lower runs of the conveyer, a member extending laterally from the inner face of each side sill member, a member seated upon the last-mentioned member and extending upwardly therefrom in inclined relation to the side sill member, and a flow control sheet supported upon the last-mentioned member and extending inwardly from the side wall of the car body.

2. A transfer car comprising side sill members extending lengthwise of the car in laterally spaced relation, a car body mounted on the frame and including side walls having inwardly sloping side wall portions thereon extending substantially to the side sill members, an endless conveyer mounted in the body below the inwardly sloping side wall portions, flow control plates extending lengthwise of the body above the endless conveyer at opposite edges thereof, means mounting the flow control plates at one edge on the side sill member substantially in alignment with the respective inwardly extending side wall portions thereof, and support members secured to the side sill members and extending substantially to the opposite edge of each flow control plate and holding said plate in braced relation relatively to the side sill member.

3. A transfer car comprising a supporting frame including side sill members extending lengthwise of the car, a car body mounted on the frame and including side walls with inwardly inclined portions extending substantially to the upper edges of the side sill members, an endless conveyer extending lengthwise of the car body below said inclined portions of the side walls, flow control plates extending lengthwise of the car body above opposite edges of the endless conveyer and overlapping the latter throughout a portion of the length of the car body, said flow control plates being substantially in the transverse planes respectively of the inwardly inclined portions of the side walls, means mounting each of said plates on the adjacent side sill member at the upper edge thereof, and brace members secured to each side sill member intermediate the height thereof and extending inwardly of the car body substantially to the inner edge of the adjacent flow control plate and secured to said inner edge portion for supporting the flow control plate securely in position.

4. In a transfer car, the combination of a hopper section having an inclined section at one end thereof and a conveyer section at the upper end of the inclined section, an endless conveyer extending rectilinearly continuously along said sections to the outer end of the conveyer section, means pivotally supporting the conveyer section on the inclined section, a sprocket mounted on the conveyer section, a hydraulic power device pivotally supported on the inclined section and having a movable piston, and a sprocket chain secured to the piston at one end and extending around the sprocket and to a fixed point on the inclined section for swinging the conveyer section relative to the inclined section upon operation of the hydraulic power device.

References Cited in the file of this patent
UNITED STATES PATENTS

| | | |
|---|---|---|
| 1,520,432 | Norelius | Dec. 23, 1924 |
| 1,888,644 | Turzicky | Nov. 22, 1932 |
| 2,095,559 | Starr et al. | Oct. 12, 1937 |
| 2,274,314 | Whaley | Feb. 24, 1942 |
| 2,297,485 | Lentz | Sept. 29, 1942 |
| 2,298,472 | Dudley | Oct. 13, 1942 |
| 2,384,182 | Lewis | Sept. 4, 1945 |
| 2,428,502 | Pettrick | Oct. 7, 1947 |
| 2,592,532 | Beck | Apr. 15, 1952 |
| 2,633,230 | Duncan | Mar. 31, 1953 |
| 2,637,456 | Felderman | May 5, 1953 |
| 2,678,485 | Browne | May 18, 1954 |
| 2,707,062 | Parker | Apr. 26, 1955 |
| 2,754,015 | Lee | July 10, 1956 |